(12) United States Patent
Erickson et al.

(10) Patent No.: US 6,903,144 B2
(45) Date of Patent: Jun. 7, 2005

(54) NON-AQUEOUS SOLVENT-FREE PROCESS FOR MAKING UV CURABLE ADHESIVE AND SEALANTS FROM EXPODIZED MONOHYDROXYLATED DIENE POLYMERS

(75) Inventors: James R. Erickson, Katy, TX (US); Esther M. Zimmermann, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 83 days.

(21) Appl. No.: 10/258,923

(22) PCT Filed: Apr. 27, 2001

(86) PCT No.: PCT/US01/13447

§ 371 (c)(1),
(2), (4) Date: Aug. 18, 2003

(87) PCT Pub. No.: WO01/81494

PCT Pub. Date: Nov. 1, 2001

(65) Prior Publication Data

US 2004/0024079 A1 Feb. 5, 2004

Related U.S. Application Data

(60) Provisional application No. 60/199,949, filed on Apr. 27, 2000.

(51) Int. Cl.$^7$ .............................. C08F 2/46; C08F 2/50; C09J 163/08; C08L 63/08
(52) U.S. Cl. ............................ 522/100; 522/3; 522/31; 522/150; 522/157; 522/158; 522/159; 522/161; 522/168; 522/170; 522/184; 522/185; 522/186; 428/355 R; 428/356; 428/355 EP; 428/355 BL; 428/355 EN; 525/98; 525/313; 525/314
(58) Field of Search ............................ 522/31, 3, 100, 522/150, 157, 158, 159, 161, 168, 170, 184, 185, 186, 109, 110, 111, 112, 181; 525/98, 313, 314; 428/355 R–355 EN

(56) References Cited

U.S. PATENT DOCUMENTS 5,229,464 A * 7/1993 Erickson et al. ............ 525/314
5,393,818 A * 2/1995 Masse et al. ............... 524/270
5,691,414 A * 11/1997 Kübler et al. ................ 525/99
5,776,998 A * 7/1998 Southwick et al. ......... 522/111
5,837,749 A * 11/1998 Erickson et al. ............. 522/31
5,840,809 A * 11/1998 Ohtsuka et al. ............ 525/316
H001786 H * 2/1999 Masse et al. ............... 522/100
6,541,553 B1 * 4/2003 Erickson et al. ............ 524/270
6,649,259 B1 * 11/2003 Hu et al. .................... 428/343
6,803,081 B2 * 10/2004 Paul .......................... 428/34.1

FOREIGN PATENT DOCUMENTS

GB          1434085         * 4/1976      ............. C08J/3/20

* cited by examiner

*Primary Examiner*—James J. Seidleck
*Assistant Examiner*—Sanza L. McClendon

(57) ABSTRACT

This invention is a process for making UV curable adhesives, sealants, coatings, ink, flexible printing plates, laminating adhesives, fibers, gaskets, and related compositions, films, and thin parts, wherein an epoxidized monohydroxylated polydiene polymer comprised of at least two different diene monomers wherein at least one is a diene monomer which yields unsaturation suitable for epoxidation is used as the binder for the composition. The preferred epoxidized monohydroxylated polymers are block copolymers of isoprene and butadiene wherein a hydroxyl group is attached at one end of the polymer molecule. These polymers may be hydrogenated or unhydrogenated. The process involves mixing the above polymer or the polymer with one or more other formulating ingredients together with and insoluble photoinitiator which is preferably selected from the group consisting of triaryl sulfonium salts. The mixture is then subjected to mixing conditions in a high speed mixer, preferably a high speed disk disperser, at a blade tip speed of from 200 to 2000 cm/sec at a temperature from 25 to 130° C., preferably from 40 to 100° C. This process is highly suited for making stable cationic photoinitiator concentrations that can be added to adhesive, coating, or sealant formulations to effect rapid UV cure.

12 Claims, No Drawings

NON-AQUEOUS SOLVENT-FREE PROCESS FOR MAKING UV CURABLE ADHESIVE AND SEALANTS FROM EXPODIZED MONOHYDROXYLATED DIENE POLYMERS

This application claims the benefit of provisional application Ser. No. 60/199,949 filed on Apr. 27, 2000.

FIELD OF THE INVENTION

This invention relates to a new process for making adhesives and sealants made from monohydroxylated diene polymers. More specifically, the invention relates to such a process wherein the normally insoluble photoinitiator is incorporated into the polymer in a very fine micro emulsion.

BACKGROUND OF THE INVENTION

The use of and a process for making novel epoxidized monohydroxylated polydienes in UV curable adhesive and sealant and compositions is described in U.S. Pat. No. 5,776,998. The polymers are combined with other ingredients such as a tackifying resin to make them suitable for adhesive and sealant products. A photoinitiator is included in the combination to promote UV curing (crosslinking) of the composition. A prior art method for making such materials involved blending the components in a nonaqueous solvent such as tetrahydrofuran (THF) and then casting adhesive films from the solution. THF was used because the particular commercial photoinitiator (mixed triaryl sulfonium hexafluoroantimonate salts in propylene carbonate) selected was not otherwise soluble in the adhesive formulation but was soluble in THF. After the adhesives were solvent cast, the THF was evaporated to leave the photoinitiator adequately dispersed in the remaining adhesive film to initiate effective UV curing upon exposure to UV light.

For many applications, the use of nonaqueous solvents is undesirable because of environmental hazards and the cost of nonaqueous solvent removal and a nonaqueous solvent itself. U.S. Pat. No. 5,776,998 described a nonaqueous solvent-free process for dispersing the same and other photoinitiators in an epoxidized monohydroxylated diene polymer formulation so that an effectively cured adhesive or sealant is produced without the problems of the solvent. The process involved mixing the components without a non-aqueous solvent under high shear conditions in a high shear mixer at a shear rate of at least 38,000 $S^{-1}$ or in a sonicator at a power density of at least 4 watts per milliliter.

The process of U.S. Pat. No. 5,776,998 was able to achieve fine dispersions having droplet sizes of less than 10 micron diameter as described in the patent. In fact, the best dispersions produced by the method of the patent were able to achieve dispersions having a droplet size of approximately one-half micron diameter. As described in the patent, good UV cured adhesive and sealant products could be produced with the dispersions produced by the mixing method described in the patent.

Experience with these dispersions (emulsions) has shown that it is very important to have a very small particle size photoinitiator emulsion. Those photoinitiator emulsions that appear by to be about 0.5 micron diameter are much more beneficial than emulsions at 1 or more micron diameter. The very fine emulsions allow almost instant curing when used at levels as low as 0.04 to 0.10 weight percent (wt %) active initiator based on the entire adhesive formulation. In addition to the obvious advantage of needing less of what is the most expensive component of the formulation, the very low levels allow the final cured formulation to have the greatest degree of heat stability. The lower the amount of residual acid, generated by the UV exposure of the photoinitiator, the less bond breakage occurs in the gel network.

A preferred method of introducing the photoinitiator emulsion to the formulation has been to first make a concentrated emulsion of the photoinitiator in one of the components of the formulation, and then add it as the last component of the formulation. Pre-making the photoinitiator concentrate has several advantages. First, it allows the photointiator emulsion to checked before use. Second, it allows the emulsion to be prepared at another site where the needed equipment is located. Third, it allows a much smaller amount of material be processed on the sonifier or very high shear equipment, thus reducing equipment size. Fourth, it allows an accurate amount of photoinitiator to be easily added to the formulation. Most often the photoinitiator concentrate has been a 5 wt % emulsion of tri-aryl sulfonium hexafluoroantimonate salt in KRATON LIQUID® Polymer L-1203 (mono-ol polymer) prepared by sonication. Sometimes it has been a 5 wt % emulsion of the same salt in KRATON LIQUID® Polymer L-207 (epoxidized mono-ol polymer) prepared by sonication.

Several improvements in the photoinitiator concentrate and its production have become apparent from working with industry. First, there has been a strong need to be able to produce the emulsion on lower shear, more readily available equipment than a sonicator or very high shear rotor/stator equipment. Second, when the photoinitiator emulsion concentrate is made ahead of time or at another location, an important feature of the emulsion concentrate is its shelf stability under storage and shipping conditions. It is very important to make dispersions which have the least tendency to agglomerate and increase in particle size, for the reasons stated above. Increased stability has been greatly desired. Third, there has always been the need to make the smallest droplet size emulsion to extract maximum cure for the minimum usage.

SUMMARY OF THE INVENTION

This invention is a process for making UV curable adhesives, sealants, coatings, ink, flexible printing plates, laminating adhesives, fibers, gaskets, and related compositions, films, and thin parts, wherein an epoxidized monohydroxylated polydiene polymer comprised of at least two different diene monomers wherein at least one is a diene monomer which yields unsaturation suitable for epoxidation is used as some portion of the binder for the composition. The preferred epoxidized monohydroxylated polymers are block copolymers of isoprene and butadiene wherein a hydroxyl group is attached at one end of the polymer molecule. These polymers may be hydrogenated or unhydrogenated.

The process involves mixing the above polymer or the polymer with one or more other formulating ingredients together with an insoluble photoinitiator which is preferably selected from the group consisting of triaryl sulfonium salts. The mixture is then subjected to relatively low shear mixing conditions in a medium to high speed mixer at a blade tip speed of from about 200 to 2000 cm/sec at a temperature from 25 to 130° C., preferably from 40 to 100° C. This process is highly suited for making stable cationic photoinitiator concentrations, usually consisting of only the photointiator and the epoxidized mono-ol polymer, that are added to adhesive, coating, sealant, etc., formulations to effect rapid UV cure. The dispersed photoinitiator droplets are less than 1 micron in diameter, preferably 0.5 micron or less, and preferably uniformly distributed in the emulsion concentrate.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, naphthalides, biphenyls or anthracenyl derivatives. The monohydroxylated polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability.

The monohydroxylated polydiene polymer of the present invention has the structural formula $$(HO)_x-AB-(OH)_y \qquad (I)$$

wherein A and B are polymer blocks which may be homopolymer blocks of conjugated diolefin monomers or copolymer blocks of conjugated diolefin monomers. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks.

The A blocks have a molecular weight of from 500 to 4,000, and preferably 1000 to 3000, and the B blocks have a molecular weight of 2000 to 10,000, preferably 3000 to 6000. x and y are 0 or 1. Either x or y must be 1, but only one at a time can be 1. Either the A or the B block may be capped with a miniblock of polymer, 50 to 1000 molecular weight, of a different composition, to compensate for any initiation, tapering due to unfavorable copolymerization rates, or capping difficulties. These polymers may be epoxidized such that they contain from 0.5 to 4 milliequivalents (meq) of epoxy per gram of polymer.

Diblocks falling within the above description are preferred. The overall molecular weight of such diblocks prior to hydrogenation and epoxidation may range from 2500 to 14,000, preferably 3000 to 7000. For example, where I represents isoprene, B represents butadiene, and a slash (/) represents a random copolymer block, the diblocks may have the following structures:

These diblocks are advantageous in that they exhibit a good viscosity for preparing photoinitiator concentrates. It is preferred that the hydroxyl be attached to the butadiene block because the epoxidation proceeds more favorably with isoprene and there will be a separation between the functionalities on the polymer. This produces a more unique surfactant-like molecule than can also cure on both ends. KRATON LIQUID® L-207 is a hydrogenated and epoxidized I—B—OH polymer that is available in commercial quantities. It falls within the preferred range for the I and B blocks. Its overall molecular weight prior to epoxidation and hydrogenation is about 5400 to 6600.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. These and other methods are described in more detail in U.S. Pat. Nos. 5,229,464 and 5,247,026 which are herein incorporated by reference. The amount of epoxidation of these polydiene polymers ranges from 0.5 to 4 milliequivalents of epoxide per gram of polymer. Lower levels are desirable to avoid overcure. Above 4 meq/g, the rigidity, crosslink density, cost, difficulty of manufacture, and polarity of the polymer (so as to not accept certain monohydroxy diene polymer and to dissolve the photoinitiator) are too high to provide benefit. The preferred amount of epoxidation is 1 to 3 meq/g and the most preferred amount of epoxidation is the amount on KRATON LIQUID® L-207 polymer, about 1.4 to 2.0 meq/g. The most preferred amount best balances rate of cure against overcure and better maintains compatibility with a variety of formulating ingredients commonly used with polydiene based adhesives. Additionally it produces excellent photointiator emulsions. Epoxidation can cause the molecular weight and the viscosity of the diblock to increase somewhat due to dimer and trimer formation. This is not detrimental to the invention.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity). For low molecular weight functionalized polymers, especially if they become slightly polydisperse because of dimer and trimer formation, the number average molecular weight should be calculated from the chromatograph. For materials to be used in the columns of the GPC, styrene-divinylbenzene gels or silica gels are commonly used and are excellent materials. Tetrahydrofuran is an excellent non-aqueous solvent for polymers of the type described herein. A refractive index detector may be used. Calibration of the GPC can done by measuring the number average molecular weight by proton NMR first on several polymers of the same type.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are useful for further functionalization to make the epoxidized polymers of this invention. The partial unsaturation preferably is such that 0.5 to 4 meq of aliphatic double bonds suitable for epoxidation remain on the polymer. If epoxidation is done before hydrogenation, then it is preferred that all remaining aliphatic double bonds be hydrogenated.

The binders of this invention may be cured by cationic means using acid catalysts but are preferably cured by means of ultraviolet or electron beam radiation. Radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used. A complete description of how this irradiation may be accomplished is found in commonly assigned U.S. Pat. No. 5,229,464 which is herein incorporated by reference.

When using radiation it is necessary to employ a photoinitiator to initiate the crosslinking reaction. For the practice of this invention, the photoinitiator must be in a liquid form and insoluble in at least one of the polymers of this invention. All of the sulfonium salt initiators currently available are in liquid form (they are dissolved in propylene carbonate) and appear to be substantially insoluble in the most preferred polymer of this invention. They are also very suitable for emulsification. On the contrary, all or most of the iodonium salt photoinitiators currently available have at least some solubility in the polymers of this invention because of the alkyl chains they bear or the cation used, and are not suitable for the invention. These may be added to the adhesive or sealant formulations as supplemental additives provided they do not destabilize the emulsion. Useful photoinitiators for emulsification include the following triarylsulfonium hexafluoroantimonate salts: Cyracure UVI-6974 (mixed triaryl type) available from Union Carbide, UVE-1014 (mixed triaryl type) available from Von Roll Isola, ADEKA Optimer SP-170 from Asahi Denka Kogyo K.K., and Sarcat CD1010 from Sartomer. The following arylsulfonium hexafluorophosphate salts also are suitable for emulsification, although they are not as desirable because of their slower cure. Cyracure UVI6990 from Union Carbide, UVE-1016 from Von Roll Isola, ADEKA Optimer SP-150 from Asahi Denka Kogyo K.K., and Sarcat CD1011 from Sartomer. Some of the soluble iodonium photoinitiators include Sarcat CD-1012 from Sartomer, Rhodorsil R-2074 from Rhodia, (4-octyloxyphenyl)-phenyl-iodonium hexafluoroantimonate or phosphate, and (4-decyloxyphenyl)-phenyl-iodonium hexafluoroantimonate or phosphate.

The onium salts can be used alone or in conjunction with a photosensitizer to respond to long wavelength UV and visible light. Examples of photosensitizers include thioxanthone, anthracene, perylene, phenothiazione, 1,2-benzathracene coronene, pyrene and tetracene. The dispersion/emulsions of the present invention may contain up to 40% by weight and more of the photoinitiator.

According to the present invention, the insoluble photoinitiators described above can be dispersed in the polymers described above, optionally with other ingredients such as tackifying resins, to produce a composition which is radiation curable without the necessity for a non-aqueous solvent. The polymer, optional resin, and photoinitiator are mixed together in mixing equipment under high speed but medium shear mixing conditions.

The mixing is accomplished at a blade tip speed of from 200 to 2000 cm/sec. If the mixing speed is less than about 200, then some of emulsified droplets can be greater than 1 micron in diameter, which slows the initial cure, and decreases the self-life of the product. If the mixing speed is roughly more than about 2000 cm/sec, then unnecessary heat is being produced. Unremoved heat energy raises the temperature of the emulsion and this tends to negate any potential advantageous effect of higher tip speed. The cut off top tip speed is not a well-defined value. It is more suggestive of what speed is expected to produce more heat than can be practically removed in a production situation. Blade tip speed is determined by the diameter of the disk (blade, impeller) and the shaft rpm. Commercial high-speed dispersers can provide up to 5000 ft/min (2540 cm/sec).

The preferred tip speed for this invention is 300 to 1500 cm/sec, and the most preferred is 800 to 1200 cm/sec. The temperature during mixing can range from 25° C. to 130° C., preferably 40° C. to 100° C., most preferably 50° C. to 80° C. At a temperature higher than 130° C., too many of the particles tend to be above 1 micron in diameter. The emulsion concentrates appears to be microemulsions, at least when not being made near the limiting bottom speed and the limiting upper temperature of the invention. Typically a microemulsion has an upper phase transition temperature where the microemulsion is no longer stable and the droplets become large. With the emulsion concentrates of this invention, the phase change temperature is not sharp, but gradual, perhaps because of the high viscosity/molecular weight of the polymer used or because of the special functionality of the polymeric "surfactant" being used. When excess temperature damages the emulsion, the "microemulsion" of this invention can easily be reformed by allowing the temperature to drop and simply remixing.

Examples of mixing equipment in which the present invention can be carried out be would most commonly available equipment that can deliver the blade tip speed and which have some heating and cooling capacity. One example which is preferred for use herein is a Hockmeyer mixer which is a high speed disk disperser normally used at shear rates well below 1000 sec$^{-1}$ for mixing paint and pigment dispersion. High-speed dispersers are described in *Paint Flow and Pigment Dispersion* by Temple C. Patton, published in 1979 by John Wiley & Sons. They are generally operated in laminar flow and certainly are not capable of producing the turbulent conditions of as high as 10,000 sec$^{-1}$ shear The equipment may also have a lid to restrict UV light exposure. Other enhancements include a vacuum kettle for defoaming and restricting UV light, a second slower mixing element to premix the components to avoid initial overheating, and additional shafts, each with its own disk, to aid in the movement of the viscous material to the high speed blade zone.

The process of this invention appears to create very stable microemulsions of the initiators. The micro emulsion droplet sizes are mostly less than 0.5 micron and most of them are at least initially too small to detected at using optical microscopy, with white light, at 2000×, in transmission mode. Generally, such optical microscopy can only resolve particles at 1 micron or larger. The presence of particles or structures less than 1 micron in diameter can still be detected by observing pseudo particles (fuzzy light and dark spots) which result from light being scattered or refracted by the small initiator droplets or by agglomerates of small droplets. As the size becomes even smaller (believed to be at about 0.5 micron) or the bunching of small droplets ceases, nothing can be detected. Attaining 0.5 micron droplet size and less, with uniform distribution of the droplets, is very important to achieving good UV cure of the final composition and the best shelf-life for the photoinitiator emulsion concentrates. The presence of the droplets and their distribution when these small sizes are reached can only be detected by much more sophisticated equipment. A Leica TSC confocal laser scanning microscope can be used in reflected mode to image such emulsion particles.

It is common practice to add an adhesion promoting or tackifying resin that is compatible with the polymer, generally from 20 to 400 parts per hundred parts of polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Hydrogenated resins are normally used when the polymer itself is hydrogenated. Useful hydrogenated resins include the Regalrez® resins from Hercules which are manufactured by selective hydrogenation of base resins polymerized using styrenic-based comonomers. The degree of hydrogenation ranges form 30% to 100%. Softening points vary from 18 to 140° C. Other useful resins include the Regalite® resins which are manufactured by selective hydrogenation of base resins polymerized from mixed aromatic monomer feed steams. Softening points vary from 90–125° C. The Regalite® T and V resins are also useful. So are the Arkon® P series resins from Arakawa. Other useful resins include polyterpene resins and liquid resins such as Adtac LV and Piccolyte® S25 from Hercules.

Aromatic resins may also be employed as tackifying agents, provided that they are compatible with the particular polymer used in the formulation and do not appreciably interfere with UV light transmission or solubility balance of the photoinitiator droplets. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Optional components of the present invention are stabilizers which inhibit or retard heat degradation, oxidation, skinformation, and color formation. Stabilizers are typically added to the commercially available compounds in order to protect the polymers against heat degradation and oxidation during the preparation, use and high temperature storage of the composition.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, non-aqueous solvent content is as low as possible to minimize shrinkage.

EXAMPLES

The materials used-in the following examples include:
1. KRATON LIQUID® Polymers L-1203A and L-1203B are both hydrogenated polybutadiene mono-ols wherein a hydroxyl group is located at one end of the molecule. A has number average molecular weight of 3750 and B has a number average molecular weight of 3500.
2. KRATON LIQUID® Polymer L-1302 is a hydrogenated isoprene-butadiene block copolymer having a number average molecular weight of about 6400.
3. KRATON LIQUID® Polymer L-207 is identical to Polymer L-1302 except that it is epoxidized, mostly in the isoprene block, such that about 1.7 meq of epoxy per gram of polymer are present on the polymer.
4. UVI-6974 is a photoinitiator made by Union Carbide which is triaryl sulfonium hexafluoroantimonate.
5. UVE-1014 is a photoinitiator from Von Roll Isola USA, Inc., which is triaryl sulfonium hexafluoroantimonate, it is interchangeable with the UVI-6974.
6. SP-170 is a photoinitiator from Adeka, believed to be similar to UVI-6974.
7. Regalite® R-91 is a hydrogenated mixed aromatic tackifying resin made by Hercules by selective partial hydrogenation of base resin polymerized from mixed aromatic monomer feed streams. It has a R & B softening point of 88° C.

In most of the experiments below, the mixing was carried out in a Hockmeyer lab/pilot sized 2 horsepower mixer. The 2 horsepower unit is capable of mixing about 1 to 4 gallons of paint or adhesive formulations and has a single shaft with a 4 inch diameter flat toothed blade attached (in some experiments, an alternative 4 inch diameter blade consisting of 3 flat surfaces welded together by two sets of fins between the 3 surfaces was used), a single speed electric motor, and a belt and pulley system to control the shaft speed. The mixer is capable of delivering continuous shaft speeds between 600 and 1900 rpm.

A lab 77 watt electric mixer equipped with a small impeller was also used. The shaft rpm could be varied between about 650 rpm and 1850 rpm. The diameter of the impeller blade was 1.5 inch.

The primary microscope used was a top of the line (vintage 1980's) Zeiss microscope equipped with, white light, a Plan 100/1.25 oil objective, a Miroimage Video Systems AutomatiCan A106A video, a Sony Triniton high resolution color video monitor, and a Toshiba HC-1200A color video printer. This microscope can not clearly resolve photoinitiator droplets smaller than about 1 micron diameter, but can detect the presence of droplets or droplet associations below 1 micron. Droplets and associated droplets smaller than about 0.5 micron cannot be detected. Also used was a very modern Leica TSC confocal laser scanning microscope was used in reflected mode to image such emulsion particles. The microscope was equipped with a 63× oil immersion lens. The lens had a 0.4 micron depth of focus and a lateral resolution of 0.15 micron. This microscope can detect droplets as small as about 0.2 micron diameter. It was used, when available, observe the detail of the microemulsions that are cannot be seen with the Zeiss microscope. A short scan time was used because the motion of the droplets in the liquid medium caused the droplets to look fuzzy.

Example 1 (Comparative)

This experiment shows the limitations of the prior art procedure as described in U.S. Pat. No. 5,776,998 for making a photoinitiator dispersion. A 50 gram batch of photoinitiator emulsion was prepared in the sonicator used in the '998 patent, a Branson 450 sonifier, using UVI-6974 photoinitiator and both L-1203A and L-1203B polymers in separate experiments. 2.5 grams of the photoinitiator and 47.5 grams of the polymer were weighed into a small bottle, heated in an over to 135° C., and then sonified for one minute and cooled. The results are shown in Table 1 below for the two polymers. As can be seen and as discussed in the '998 patent, an emulsion with small droplet size was achieved using L-1203A. L-1203A had a higher molecular weight (and viscosity) than L-1203B. The emulsion effected a fast cure in an adhesive formulation. On the other hand, the emulsion formed using L-1203B had easily seen droplets using the Zeiss with droplets as large as 2.5 micron and even larger when heat aged. It was very ineffective in the same formulation for causing UV cure, as seen below. This behavior is typical of what we have observed with these photoinitiator emulsions. Larger droplets seen using the Zeiss, correspond to poorer UV cure. This example also demonstrates the importance of having a certain minimum molecular weight/viscosity to help stabilize the photoinitiator emulsion concentrate. The sonication should be expected to instantaneously make made very small droplets when using L-1203B as well as with L-1203A. The fact that they were not observed suggests they could not remain stable even for the time it took for the dispersion to cool and make the photomicrographs because the viscosity was too low to retard the droplet-droplet collisions.

Testing for Cure:

|  | A | B |
|---|---|---|
| L-207 | 20.28 | 20.28 |
| L-1203A | 23.21 | 23.21 |
| Regalite R91 | 54.95 | 54.95 |
| 5 wt % emulsion made with L-1203A | 1.60 | 0 |
| 5 wt % emulsion made with L-1203B (no heat or re-sonication) | 0 | 1.60 |
|  | UV curing* | |
| As soon as film cools | Cured to touch | Goo, no cure |
| After 4 days at room temperature | Cured to touch | Not cured to touch, some dark cure developing |
| After 21 days at room temperature | Cured to touch | Cured to touch |

*The adhesives were applied to 2 mil, corona treated, Mylar film preheated to 60° C., and immediately UV cured with a 300 watt/inch Fusion H bulb, dose was 200 mJ/cm².

Example 2 (Comparative)

As another comparative example, the apparent problem of too low a continuous phase viscosity was investigated by trying to sonify UVI-6974 into a tackifying resin that is typical of those used in adhesives for cationic UV cure using this type of polymer. Regalite® R-91 resin has a lower molecular weight ($M_n$ is about 600) than Polymer L-1203B ($M_n$=3500) and at room temperature it is a solid. 2.0 grams of UVI-6974 and 38.0 grams of Regalite® R-91 tackifying resin were added to a small glass bottle, heated to 135° C., and sonicated for 1.5 minutes. A sample was removed and placed on a microscopic slide and a cover slip placed over it. It immediately solidified. The rest was poured onto release paper which caused it to solidify almost immediately. Although the mixture was very low in viscosity during the sonication stage, and very small droplets may have formed instantaneously, most of the dispersed photoinitiator was in large droplets. See the results shown in Table 2 below wherein the Zeiss detectable emulsion droplet size ranged from 0.5 up to 2.4 micron.

TABLE 1

Example: Comparative examples

| Reference | Polymer | PI | PI, wt % | Method | Aging/treatment conditions | Observeable droplet/association size, Zeiss, micron |
|---|---|---|---|---|---|---|
| 24561-87A | L-1203A | UVI-6974 | 5.0 | sonication | unknown time at room temperature | Between 0.5 and 1.0, but most near no detection limit side (0.5 side) |
| 24561-87B | L-1203B | UVI-6974 | 5.0 | sonication | 5 days at room temperature | A little below 1.0 to 2.5 |
|  |  |  |  |  | sample above immediately after heating to 120° C., and recooling | 1.0 to 3.4 |
|  |  |  |  |  | sample above immediately after resonifying for 1.5 minutes | Slightly below 1.0 to 1.0 |
|  |  |  |  |  | sample above immediately after sonifying for another 1.5 minutes | 0.5 to 1.0 |
|  |  |  |  |  | sample immediately above aged one day at room temperature | from 0.5 to 1.4 |

TABLE 2

Example: Comparative example

| Reference | Tackifying Resin | PI | PI, wt % | Method | Aging/treatment conditions | Observable droplet/association size, Zeiss, micron |
|---|---|---|---|---|---|---|
| 24561-41 | Regalite R-91 | UVI-6974 | 5.0 | sonication | immediately | 0.5 to 2.4 |

Example 3

A small amount of UVI-6974 photoinitiator (5 percent of the mixture) was dispersed into L-207 epoxidized polymer using the Hockmeyer mixer described above. The polymer was transferred into a stainless steel pot and warmed in a 100° C. oven. The pot was placed on a hot plate under the mixture and heated to 135° C. using the hot plate and low speed mixing. Once the mixture was at 135° C., the shaft speed was increased to 1800 rpm. While at 1800 rpm, the photoinitiator was added slowly over about 10 minutes. The mixture was mixed another 10 minutes at 1800 rpm while maintaining the temperature of the batch at about 135° C. The mixer was turned off and a small sample was taken and observed with the Zeiss microscope. The droplets of the photoinitiator were in the 0.5 to 1.0 micron range desired, as reported in Table 3 below. Two hours later, the batch temperature had decreased to 65° C. At that point, another sample was taken and observed under the microscope. No change could be observed. The particle size, number, and distribution looked the same. The droplet size and distribution continued to look about the same as obtained when making a dispersion of the photoinitiator by the sonication method.

A micro emulsion normally has an upper temperature limit above which the micro emulsion breaks. Often that temperature is in the 70 to 100° C. range. Speculating that the interaction between the photoinitiator and the L-207 polymer might have some special significance in this case, perhaps even to be suitable for micro emulsion formation, the mixer was turned back on. The speed was quickly (about three minutes) dialed up to 2050 rpm. This was too fast for the belt/pulley system to handle and the drive belt flew off the pulley and broke. Unfortunately, the mixer had only been on for three minutes when the belt broke. However, this was advantageous since there was little time for the temperature to rise significantly above 65° C. A sample was taken from the pot, without any great expectations because of the short mixing time, for microscopy. Surprisingly, even with only the extremely short mixing time, the emulsion was improved dramatically. Almost none of the photoinitiator droplets could be seen with the Zeiss microscope. Apparently, a much finer emulsion had been made than those previously achieved by sonication and temperature appeared to be a critical factor.

With a Hockmeyer mixer or similar equipment, the L-207 polymer could be mixed well at a temperature as low as 65° C. without temperature buildup, apparently because of lower shear, yet a much finer and probably more stable emulsion could be made. The Hockmeyer mixer was run under conditions of laminar flow. Under laminar flow conditions, the maximum shear rate, R, is equal to the tip speed, expressed in cm/se, divided by the separation distance between the disk and the bottom of the mixing tank, also given in cm. Normal distance between the disk and the bottom of the tank to produce a normal flow pattern is 0.5 to 1.0 times the disk diameter, which corresponds to 5.08 cm to 10.16 cm for a 4 inch blade. Therefore, the maximum shear rate seen in the each mix is approximately the tip speed divided by 5.08 cm.

As a final test to check the usefulness of this particular emulsion, a small amount was added to a pressure sensitive adhesive (the active photoinitiator was 0.04 percent by weight of the formulation) and the warm adhesive was exposed to UV light. The adhesive cured nearly instantaneously. It was cured completely to the touch within 20 seconds after the brief exposure.

TABLE 3

Example: First experiment using the 4 inch flat ring blade on the Hockmeyer

| Batch | Polymer | PI | PI, wt % | Temperature ° C. | Mixing RPM | Shear Rate sec$^{-1}$ | Tip Speed cm/sec | Total mixing time at given rpm, minute | Aging conditions | Observable droplet/ association size, Zeiss micron |
|---|---|---|---|---|---|---|---|---|---|---|
| 24561-42 | L-207 | UVI-6974 | 5.0 | 135 | 1800 | 189 | 958 | 10 | immediately | Within the 0.5 to 10 range |
| | | | | | | | | | 2 hours later, batch had cooled to 65° C. | Within the 0.5 to 1.0 range, no change |
| | | | | 65 | 600 increasing steadily to 2050 | 63–215 | 319–1091 | 3 | immediately | Very little detectable, a few in the 0.5 to 1.0 range, near the low limit side. |

Example 4

In this experiment, an alternative blade was used for the Hockmeyer mixer. This was a 4 inch diameter blade consisting of three flat surfaces welded together by two sets of fins between the three surfaces. The manufacturer's literature suggests that this blade arrangement provides somewhat increased shear over that of the other blade.

The three polymers, L-1302, L-207, and L-1203, were compared for their ability to disperse the insoluble photoinitiator UV-6974. The photoinitiator was dispersed in each of the polymers using increasing speed as shown in Table 4 below. As seen from the table, only L-207 was effective in producing a very fine droplet sized emulsion. The droplets produced were actually too small to be observed using the Zeiss microscope. The emulsion appeared to be more akin to a micro emulsion than any regular emulsion formed by the application of very high shear. The other two polymers produced coarse emulsions which are commercially unacceptable. They would result in slow cure and would have a very short lifetime because the larger droplets would quickly assimilate the remaining smaller droplets and that would prevent cure. The triple ring blade was suitable for making the good, extremely small emulsions using the insoluble photoinitiator and Polymer L-207 but did not appear to be as effective as the simpler flat blade used previously. The flat blade produces somewhat less shear and somewhat more mixing action and appears more suitable for making the extremely fine dispersions which are the desired result of the present invention.

Example 5

The triple ring blade was removed and replaced with the toothed flat blade used earlier. Two of the emulsions (−69 and −70) of Example 4 were weighed into a pot at a ratio of 5 parts of the emulsion with L-207 and 95 parts of the emulsion with L-1302. The blend was heated to 60° C. and then mixed for 20 minutes at 1800 rpm. A small sample was removed and examined for droplet size. The presence of just five parts of the L-207/photoinitiator dispersion was enough to radically improve the emulsion (as compared against the L-1302 emulsion of Example 4) as shown in Table 5 below. In a second experiment, additional L-207 emulsion was added to the pot to yield a new blend ratio of 20 parts of that emulsion and 80 parts of the L-1302 emulsion. Starting from 60° C. again, the blend was mixed at 1800 rpm for 20 minutes. The resulting emulsion was so improved that it looked indistinguishable from the 100 percent L-207/photoinitiator emulsion of Example 4 as can be seen in Table 5 below. This shows that the interaction of the L-207 with the photoinitiator is special enough that only 20 percent of the available polymer in emulsion concentrate has to be L-207. Again, the small sized emulsion occurring at a low mixing temperature suggests that a micro emulsion was occurring.

TABLE 4

Example: Comparing polymers using the 4 inch diameter triple ring blade on the Hockmeyer

| Batch | Polymer | PI | PI, wt % | Sample number | Temperature, ° C. | Shear Rate $sec^{-1}$ | Tip Speed cm/sec | Mixing RPM | Mixing time, minute | Aging conditions | Observable droplet/ association size, Zeiss, micron |
|---|---|---|---|---|---|---|---|---|---|---|---|
| 24561-69A | L-1302 | UVI-6974 | 5.0 | A2 | 58 to 60 | ≧65 | 329 | 617 to 620 | 20 | within a few hours | 1 to 3 |
| | | | | A4 | 61 to 63 | ≧126 | 640 | 1202 to 1204 | additional 20 | within a few hours | 1 to 7 |
| | | | | A6 | 65 to 68 | ≧189 | 961 | 1804 to 1807 | additional 20 | within a few hours | 1 to 2 |
| 24561-70B | L-207 | UVI-6974 | 5.0 | B2 | 60 to 63 | ≧63 | 321 | 602 to 604 | 20 | within a few hours | Some 0.5 to 1.0 detectable, most of field blank |
| | | | | B4 | 64 to 65 | ≧127 | 643 | 1203 to 1212 | additional 20 | within a few hours | Few 0.5 to 1.0 detectable, almost all of field blank |
| | | | | B6 | 66 to 70 | ≧189 | 962 | 1803 to 1814 | additional 20 | within a few hours | Almost none in 0.5 to 1.0 range, field is basically blank |
| | | | | | | | | | | after 5 weeks at room temperature | Almost none in 0.5 to 1.0 range basically blank |
| | | | | | | | | | | 4 weeks at room temperature, followed by 1 week at 70° C. | approx. 0.5 |
| 24561-72C | L-1203 | UVI-6974 | 5.0 | C2 | 33 to 34 | ≧64 | 608 to 609 | 608 to 609 | 20 | | No photomicrograph available |
| | | | | C4 | 37 to 39 | ≧126 | 1203 to 1204 | 1203 to 1204 | additional 20 | | No photomicrograph available |
| | | | | C6 | 43 to 48 | ≧189 | 1803 to 1804 | 1803 to 1804 | additional 20 | within a few hours | 0.5 to 1.4 |
| 24561-71D | L-1203 | UVI-6974 | 5.0 | D6 | 60–69 | ≧189 | 1800 | 1800 | 20 minutes at 600 + 20 at 1200 + additional 20 | within a few hours | 0.5 to 2.7 |

TABLE 5

Example: Blending experiment using the 4 inch flat ring blade on the Hockmeyer

| Batch | Polymer | PI | PI, wt % | Temperature ° C. | Mixing RPM | Shear Rate sec$^{-1}$ | Tip Speed cm/sec | Mixing time, minutes | Aging conditions | Observable droplet/ association size, Zeiss, micron |
|---|---|---|---|---|---|---|---|---|---|---|
| 24561-75A | 5 parts L-207 and 95 parts L-1302 | UVI-6974 | 5.0 | approx. 60 | 1800 | 189 | 958 | 20 | within hours of manufacture | 0.5 to 1.0 range |
| 24561-75B | 20 parts L-207 and 80 parts L-1302 | UVI-6974 | 5.0 | approx. 60 | 1800 | 189 | 958 | 20 | within hours of manufacture | Almost none in 0.5 to 1.0 range, field is basically blank |
| | | | | | | | | | after 2 weeks at room temperature | Almost none in 0.5 to 1.0 range, field is basically blank |
| | | | | | | | | | 1 week at room temperature followed by 1 week at 70° C. | Some in the 0.5 to 1.0 range, most of the field is blank |

Example 6

To further define the most desirable mixing temperature for making the L-207/photoinitiator special emulsion, batches were made using 60° C. and 90° C. as the mixing temperatures. The results are shown in Table 6 below. Clearly, it can be seen that 90° C. is an acceptable temperature but that it is not as good as 60° C. The results in the table also continue to show that better emulsions are formed by mixing at high shaft speeds (greater blade tip speed) as long as the temperature can be controlled.

TABLE 6

Example: Evaluating mix temperature using the 4 inch flat ring blade on the Hockmeyer

| Batch | Polymer | PI | PI, wt % | Temperature ° C. | Mixing RPM | Shear Rate sec$^{-1}$ | Tip Speed cm/sec | mixing time, rpm, minutes | Aging conditions | Observable droplet/ association size, Zeiss, micron |
|---|---|---|---|---|---|---|---|---|---|---|
| 24561-44B | L-207 | UVE-1014 | 5.0 | 60–62 | 613 | 64 | 326 | 5 | within hours of mixing | 0.5 to 1.0 range |
| | | | | about 61 | 613 | 64 | 326 | Additional 20 | within hours of mixing | A reduced number in 0.5 to 1.0 range, much of field nearly blank |
| | | | | | | | | | 1 week at 70° C. | 0.5 to 1.0 range |
| | | | | 65 | 1206–1210 | 127 | 643 | Additional 5 | within hours of mixing | A reduced number in 0.5 to 1.0 range, much of field nearly blank |
| | | | | 65 | 1206–1210 | 127 | 643 | Additional 20 | within hours of mixing | A reduced number in 0.5 to 1.0 range, much of field nearly blank |
| | | | | | | | | | 1 week at 70° C. | A few in 0.5 to 1.0 range, almost all of field nearly blank |

TABLE 6-continued

Example: Evaluating mix temperature using the 4 inch flat ring blade on the Hockmeyer

| Batch | Polymer | PI | PI, wt % | Temperature ° C. | Mixing RPM | Shear Rate sec$^{-1}$ | Tip Speed cm/sec | mixing time, rpm, minutes | Aging conditions | Observable droplet/association size, Zeiss, micron |
|---|---|---|---|---|---|---|---|---|---|---|
| | | | | 64–70 | 1801–1806 | 189 | 960 | Additional 5 | within hours of mixing | Nothing detectable, field is blank |
| | | | | 66 to about 70 | 1801–1806 | 189 | 960 | Additional 20 | within hours of mixing | Nothing detectable, field is blank |
| | | | | | | | | | 1 week at room temperature | Nothing detectable, field is blank |
| | | | | | | | | | 1 week at 70° C. | Nothing detectable, field is blank |
| 245610-44A | L-207 | UVI-6974 | 5.0 | 90 | 603–618 | 64 | 325 | Additional 5 | within hours of mixing | 0.5 to 1.0 range |
| | | | | 90 | 603–618 | 64 | 325 | Additional 20 | within hours of mixing | A reduced number in 0.5 to 1.0 range, some of field nearly blank |
| | | | | | | | | | 1 week at 70° C. | 0.5 to 3 |
| | | | | 92 | 1206–1217 | 127 | 644 | Additional 5 | within hours of mixing | A reduced number in 0.5 to 1.0 range, much of field nearly blank |
| | | | | 93 | 1206–1217 | 127 | 644 | Additional 20 | within hours of mixing | A reduced number in 0.5 to 1.0 range, much of field nearly blank |
| | | | | | | | | | 1 week at 70° C. | 0.5 to 1.0 |
| | | | | 93–100 | 1802–1810 | 139 | 961 | Additional 5 | within hours of mixing | A reduced number in 0.5 to 1.0 range, much of field nearly blank |
| | | | | 93 to about 100 | 1802–1810 | 136 | 961 | Additional 20 | within hours of mixing | Few if any detectable in 0.5 to 1.0 range, all of field nearly blank |
| | | | | | | | | | 1 week at room temperature | Some in 0.5 to 1.0 range near low limit, field looks nearly blank |
| | | | | | | | | | 1 week at 70° C. | Nothing detectable, field is blank |

Example 7

Using the old sonication method, emulsions at greater than 5 percent weight loading of the photoinitiator were very unstable and unsuitable for commercial use. In the present example, emulsions of the photoinitiator and Polymer L-207 were prepared at 5, 20, and 40 percent weight photoinitiator loading. The results of the experiment are described in Table 7 below. In the table, it is seen that excellent emulsions can be prepared at all three of the loadings and that the emulsions are very stable at room temperature. When the emulsions are stored at 70° C. for a week, it appears that there is benefit to using the 5 percent loading as these results show that the elevated temperature emulsion stability is increased at lower loading, i.e., 5 percent>20 percent>40 percent. However, the temperature by the end of the mixing increased as a function of photoinitiator loading. At 40 percent loading, the temperature reached 88° C. by the end of the mixing and this has already been shown to be less desirable than 60° C. in a previous example. It is likely that had a pot been constructed with a cold water jacket or cooling coils, a temperature of 60° C. or possibly less could have been maintained and the 70° C. stability check samples may have looked considerably better. The concentrates that were affected by the heat aging should be completely restorable to their original condition simply by re-mixing them as instructed by this invention.

TABLE 7

Example: High PI loading experiment using the 4 inch flat ring blade on the Hockmeyer

| Batch | Polymer | PI | PI, wt % | Temperature °C. | Mixing RPM | Shear Rate sec$^{-1}$ | Tip Speed cm/sec | Mixing time, minutes | Aging conditions | Observable droplet/association size, Zeiss, micron |
|---|---|---|---|---|---|---|---|---|---|---|
| 24561-84 | L-207 | UVE-1014 | 5.0 | approx. 60 | 1800 | 189 | 958 | 20 | after 2 weeks at room temperature | Nothing detectable, field is blank |
|  |  |  |  |  |  |  |  |  | 1 week at room temperature followed by 1 week at 70° C. | Nothing detectable, field is blank |
| 24561-77A | L-207 | UVI-6974 | 20.0 | 60–73 | 1800 | 189 | 958 | 20 | within hours of manufacture | Nothing detectable, field is blank |
|  |  |  |  |  |  |  |  |  | after 2 weeks at room temperature | Nothing detectable, field is blank |
|  |  |  |  |  |  |  |  |  | after 4 weeks at room temperature | Nothing detectable, field is nearly blank |
|  |  |  |  |  |  |  |  |  | 3 weeks at room temperature, followed by 1 week at 70° C. | .05 to 1.0 |
| 24561-77B | L-207 | UVI-6974 | 40.0 | 60–88 | 1800 | 189 | 958 | 20 | within hours of manufacture | Nothing detectable, field is blank |
|  |  |  |  |  |  |  |  |  | after 2 weeks at room temperature | Nothing detectable, field is blank |
|  |  |  |  |  |  |  |  |  | after 4 weeks at room temperature | Nothing detectable, field is blank |
|  |  |  |  |  |  |  |  |  | 3 weeks at room temperature, followed by 1 week at 70° C. | 0.5 to 2 |

Example 8

This example contains a comparison of the sonication method of the '998 patent to the method which is the subject of the present invention. A 4000 gram batch of the emulsion of the present invention was prepared on the Hockmeyer mixer equipped with a flat toothed 4 inch diameter blade. 3800 grams of L-207 polymer were added to the stainless steel pot and heated up to 65° C. The mixer was set to approximately 600 rpm and 200 grams of photoinitiator UVE-1014 were slowly added. After the addition was complete, the mixer speed was increased to about 1950 rpm and the batch was mixed for 20 minutes. Air cooling was used and the final batch temperature reached 79° C. The mixer was turned off and the batch was filled into amber containers for storage.

A 50 gram batch of photoinitiator emulsion was prepared on the sonicator described above using UVE-1014 and L-207 polymer in the following manner. 2.5 grams of the photoinitiator and 47.5 grams of the polymer were weighed into a small bottle, heated in an oven to 135° C., and then sonified for 1 minute. The mixture was allowed to cool for 2 minutes and then resonified for an additional minute. The maximum temperature reached was 187° C. Double sonication was used because the viscosity of the L-207 polymer is sufficiently high such that it is visually obvious that a single sonication for 1 minute does not make a uniform mixture. Also, a 50 gram batch of emulsion was made using the same photoinitiator and Polymer L-1203 in a similar way, except that only a single 1 minute sonication cycle was needed because of the lower viscosity of the L-1203 polymer. The maximum temperature reached was 171° C. The three batches were examined using optical microscopy. The results are shown in Table 8 below. It can be seen that the method of the present invention produces droplets which are much smaller than the droplets produced by the prior art sonication method.

TABLE 8

| Batch | Polymer | PI | PI, wt % | Method | Aging conditions | Zeiss, micron | Leica, micron |
|---|---|---|---|---|---|---|---|
| 24561-87A | L-207 | UVE-1014 | 5.0 | Invention | 5 days at room temperature | Nothing detectable, blank field | No data |
|  |  |  |  |  | Aged 12 days at room temperature | Nothing detectable, blank field | Droplets about 0.2, very uniformly distributed |

TABLE 8-continued

| Batch | Polymer | PI | PI, wt % | Method | Aging conditions | Zeiss, micron | Leica, micron |
|---|---|---|---|---|---|---|---|
| | | | | | aged 5 days, followed by 1 week at 70° C. | Some in 0.5 to 1.0 range mostly a nearly blank field | Droplets about 0.2, uniformly distributed |
| 24561-87B | L-207 | UVE-1014 | 5.0 | sonication | within hours of preparation | Some 0.5 to 1.0, but fewer and smaller than for −87C | No data |
| | | | | | Aged 12 days at room temperature | 0.5 to 1.8 | Droplets about 0.2, but not quite as uniform as for 87A |
| | | | | | aged 5 days, followed by 1 week at 70° C. | 0.5 to 2.2 | Droplets about 0.2, looks somewhat flocculated, void areas in between |
| 24561-87C | L-1203 | UVE-1014 | 5.0 | sonication | within hours of preparation | 0.5 to 1.0 | No data |
| | | | | | Aged 12 days at room temperature | .05 to 1.7 | Droplets about 0.2, less uniform than 87A and 87B, has a flocculated look |
| | | | | | aged 5 days, followed by 1 week at 70° C. | 0.5 to 6.6 | Droplets about 0.2, droplets in clusters, look flocculated, large void areas in between |

Example 9

A 5% emulsion photoinitiator concentrate was made using EKP-206 epoxidized mono-ol polymer and UVE-1014 as the initiator. EKP-206 is not an example of the present invention because it contains polymerized styrene in the second block. It has about 1.5 meq/g of epoxy. EKP-206 is much more viscous than L-207 at room temperature because it has a higher glass transition temperature, but near 100° C. and higher is similar to that of L-207 because it about the same molecular weight. It was expected that it would be more difficult to keep the temperature in the most preferred range of the invention, which is 50° to 80° C. As in several of the previous examples, the Hockmeyer high speed disperser was used. 3800 grams of EKP-206 were added stainless steel container and warmed in an oven to about 60° C. The container was placed under the Hockmeyer equipped with the 4 inch flat blade placed into the liquid and stirred at 625 rpm. When the material was stirring well, at a temperature of 69° C., 200 grams of UVE-1014 was added over 5 minutes. The mixture was mixed for 20 minutes, mixing was stopped briefly and a sample was taken for microscopy, the speed was increased to about 1200 rpm and the mixture was mixed another 20 minutes, the mixer was stopped briefly and a sample was taken. The mixing speed was then increased to about 1800 rpm and mixed another 20 minutes and then mixing was stopped. The final temperature of the emulsion was 84° C. The table below shows details the conditions and shows the Zeiss microscopy results. An emulsion of droplet size required by the present invention could not be made. Because the droplets are so large and therefore so few are photographed, the photomicrographs taken offer insufficient evidence to even assert that particle size is decreasing with increase tip speed.

Example 9
Using EKP-206 epoxidized, hydrogenated, I-B/styrene-OH mono-ol polymer, 4 inch disc

| Batch | Polymer | PI | PI, wt % | Temperature ° C. | Mixing RPM | Tip Speed cm/sec | Mixing time, minutes | Aging conditions | Observable droplet/ association size, Zeiss, micron |
|---|---|---|---|---|---|---|---|---|---|
| 24177- | EKP-206 | UVE-1014 | 5.0 | 69–68 | 625–606 | 327 | 20 | Several days after preparation | 0.6 to 3.4 |
| | | | | 72–80 | 1197–1203 | 638 | Additional 20 | Several days after preparation | 0.6 to 3.9 |
| | | | | 80–84 | 1811–1827 | 968 | Additional 20 | Several days after preparation | 0.6 to 2.0 |

Example 10

Different low shear mixing equipment was used in this example. The equipment was the lab 77 watt electric stirring motor equipped with a lab type 3 vanes (rounded) impeller blade where the 3 vanes are flat but turned at fixed an angle to the liquid. The diameter of circular pattern the spinning blade produces was 1.5 inches. 95 grams of L-207 were weighted into a Pyrex beaker, warmed and placed on a hot plate under the mixer and mixed until a temperature of 66° C. was achieved at the minimum speed for the mixer of 650 rpm. 5.0 grams of UVE-1014 were added, and the mixing was continued for 20 minutes. The mixer was stopped briefly and a sample for microscopy was taken. The mixer was increased to the maximum speed it could produce under the load, 1650 rpm, and the emulsion was mixed for another 30 minutes. The beaker was removed from the mixer and the bottom and sides were inspected to make sure that none of the photoinitiator had not been mixed in. An excellent emulsion concentrate of the invention was obtained at the higher mixing speed. The emulsion formed at the lower speed was considered of borderline quality, just outside the scope of invention when judged by droplet size under the Zeiss microscope. See the table below.

A counter example was prepared in as identical a means as possible using L-1203 polymer. 95 grams of L-1203 were added to a Pyrex beaker, placed under the same mixer, and heated and mixed until the temperature of the polymer was 65C. 5.0 grams of UVE-1014 were added and mixed for 20 minutes at the minimum speed the mixer would run, this time measure at 650 rpm. The mixer as briefly stopped and a sample was taken for microscopy. The sample was very clear to the naked eye, indicating that either the photoinitiator was sitting on the bottom of the beaker or the emulsion formed was very course. The mixer was restarted and the speed mixture was mixed for 20 minutes at the maximum speed obtainable from the mixer, in this case 1850 rpm. The final mixing temperature was 67° C. An emulsion of small size, such as delivered by the present invention, was not formed. See the table below.

We claim:

1. A process, which does not utilize a non-aqueous solvent, for producing a ultraviolet curable adhesive, coating, or sealant composition comprising a monohydroxylated epoxidized polydiene block copolymer comprised of at least, two different diene monomers wherein at least one is a diene monomer which yields unsaturation suitable for epoxidation and wherein the polymer contains from 0.5 to 4.0 milliequivalents of epoxy per gram of polymer, and, optionally, other formulating ingredients, said process comprising mixing the epoxidized polymer and optional formulating ingredients with a photoinitiator which is insoluble in the polymer in a high speed mixer under mixing conditions of a blade tip speed of from 200 to 2000 centimeters per second at a temperature from 25 to 130° C.

2. The process of claim 1 wherein the blade tip speed is from 300 to 1500 cm/sec.

3. The process of claim 1 wherein the blade tip speed is from 800 to 1200 cm/sec.

4. The process of claim 1 wherein the temperature is from 40 to 100° C.

5. The process of claim 4 wherein the temperature is from 50 to 80° C.

6. The process of claim 1 wherein the polymer is a diblock polymer of isoprene and butadiene wherein the isoprene block contains most of the epoxidation and the hydroxyl group is on the end of the butadiene block.

7. The process of claim 6 wherein the polymer has a number average molecular weight of 2500 to 14,000.

8. The process of claim 7 wherein the polymer has a number average molecular weight of 3000 to 7000.

9. The process of claim 7 wherein the polymer has from 1 to 3 milliequivalents of epoxy per gram of polymer.

10. The process of claim 9 wherein the polymer has a number average molecular weight of 5400 to 6600 and from 1.4 to 2.0 milliequivalents of epoxy per gram of polymer.

11. The process of claim 1 wherein the insoluble photoinitiator is a triaryl sulfonium salt.

12. The process of claim 1 wherein the mixing equipment is comprised of a high speed disk disperser.

Example 10
Use of simple mixer

| Batch | Polymer | PI | PI, wt % | Temperature ° C. | Mixing RPM | Tip Speed cm/sec | Mixing time, minutes | Aging conditions | Observable droplet/ association size, Zeiss, micron |
|---|---|---|---|---|---|---|---|---|---|
| 24177- | L-207 | UVE-1014 | 5.0 | 63–66 | 650 | 130 | 20 | Within hours | 0.5 to 1.2 |
| | | | | 66–64 | 1650 | 329 | 30 | Within hours | None detectable, field is blank |
| 24177- | L-1203 | UVI-6974 | 5.0 | 65–67 | 650 | 130 | 20 | Within hours | No data |
| | | | | 65–67 | 1850 | 369 | 20 | Within hours | 1 to 5.6 |